(12) United States Patent
Meier

(10) Patent No.: US 10,132,057 B2
(45) Date of Patent: Nov. 20, 2018

(54) TRAVELING WORKING MACHINE

(75) Inventor: Simon Meier, Memmingen (DE)

(73) Assignee: Liebherr-Hydraulikbagger GmbH, Kirchdorf/Lller (DE)

( * ) Notice: Subject to any disclaimer, the term of this patent is extended or adjusted under 35 U.S.C. 154(b) by 1022 days.

(21) Appl. No.: 12/485,353

(22) Filed: Jun. 16, 2009

(65) Prior Publication Data
US 2009/0309412 A1 Dec. 17, 2009

(30) Foreign Application Priority Data

Jun. 16, 2008 (DE) .................... 20 2008 008 044 U

(51) Int. Cl.
*E02F 9/22* (2006.01)
*B60T 10/04* (2006.01)
*B60T 13/68* (2006.01)

(52) U.S. Cl.
CPC ............ *E02F 9/2217* (2013.01); *B60T 10/04* (2013.01); *B60T 13/686* (2013.01); *E02F 9/226* (2013.01); *E02F 9/2228* (2013.01)

(58) Field of Classification Search
CPC ............................ B60T 138/141; B60T 13/686
USPC ............... 303/3, 9.61, 155, 125; 701/70, 50
See application file for complete search history.

(56) References Cited

U.S. PATENT DOCUMENTS

| 4,435,021 A | 3/1984 | Hoenick |
| 7,517,026 B1* | 4/2009 | Herbst et al. ..................... 303/3 |
| 2002/0070068 A1* | 6/2002 | Eriksen et al. ............... 180/306 |
| 2004/0249537 A1* | 12/2004 | Legner et al. .................. 701/50 |
| 2009/0112391 A1* | 4/2009 | Uematsu ........................ 701/29 |

FOREIGN PATENT DOCUMENTS

| DE | 10197080 | 5/2007 |
| JP | 2003-269205 | 9/2003 |
| WO | WO 0249896 A1 * | 6/2002 |
| WO | 03/038200 | 5/2003 |
| WO | WO 2007007652 A1 * | 1/2007 |

* cited by examiner

*Primary Examiner* — Bradley T King
(74) *Attorney, Agent, or Firm* — Dilworth & Barrese, LLP

(57) ABSTRACT

The present invention relates to a traveling working machine, in particular a hydraulic excavator, with a traveling gear and with a hydraulic service brake system for the traveling gear, which is supplied with brake pressure via at least one brake valve. In accordance with the invention, the brake valve can be actuated electrically, wherein it is connected with a control element via an electric control line, by means of which an operator can brake the traveling working machine.

9 Claims, 1 Drawing Sheet

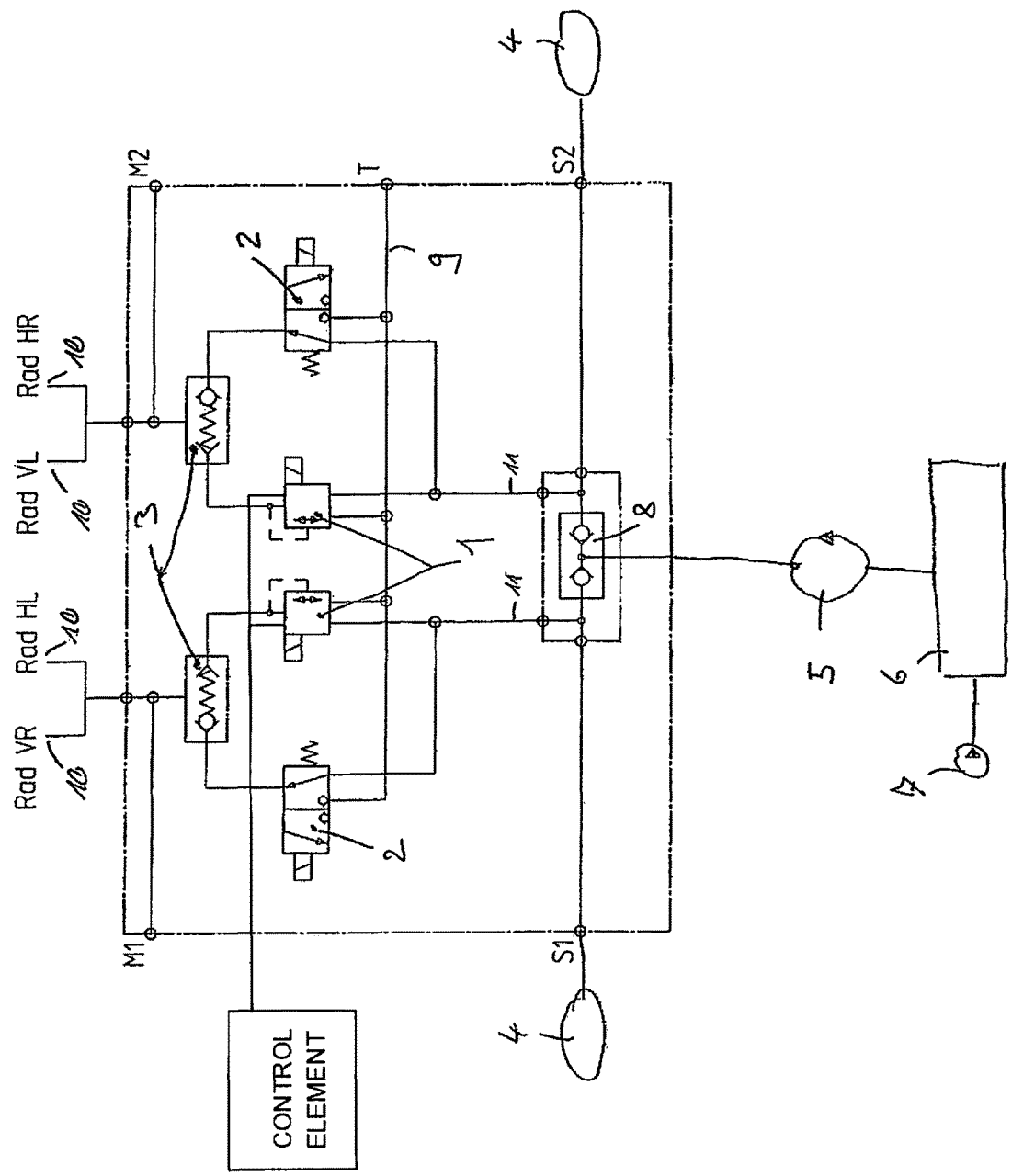

TRAVELING WORKING MACHINE

BACKGROUND OF THE INVENTION

The present invention relates to a traveling working machine, in particular a hydraulic excavator, with a traveling gear and with a hydraulic service brake system for the traveling gear, which is supplied with brake pressure via at least one brake valve. Via this hydraulic service brake system, the traveling working machine can be braked while driving. In particular, the present invention relates to traveling construction machines with a corresponding service brake system.

In known traveling working machines with a hydraulic service brake system, the brake valves via which the brake pressure is controlled are arranged in the operator cabin and can be actuated mechanically by the operator via a control element, e.g. a brake pedal. As a result, long hydraulic lines from the brake valve to the brakes must be provided for the traveling gear. Especially in a cabin with a hoisting gear or a glass bottom in the cabin, such hydraulic lines are extremely disturbing. In addition, large machines involve the problem that a braking deceleration occurs due to the very long brake lines from the cabin to the traveling gear.

SUMMARY OF THE INVENTION

Therefore, it is the object of the present invention to provide a traveling working machine with an improved service brake system.

This object is solved by a traveling working machine according to the description herein. Such traveling working machine, in particular a hydraulic excavator, includes a traveling gear and a hydraulic service brake system for the traveling gear, which is supplied with brake pressure via at least one brake valve. In accordance with the invention, it is provided that the brake valve can be actuated electrically, wherein it is connected with a control element via an electric control line, by means of which an operator can brake the traveling working machine. Due to the electric actuation of the brake valve, the same can be arranged in direct vicinity of the brakes of the service brake system. As a result, disturbing hydraulic lines can be omitted in the operator cabin. The expensive tubing from the cabin to the traveling gear and back can also be omitted. The braking deceleration occurring in the case of long brake lines also can be avoided thereby.

The hydraulic service brake system includes one or more brakes for the traveling gear, which are supplied with brake pressure via the brake valve, wherein this brake valve now is actuated electrically. By actuating the control element, e.g. a brake pedal, the operator can brake the traveling working machine while driving like with known service brake systems. For this purpose, the control element converts the control movement of the operator into electrical signals, by which the brake valve is actuated.

Advantageously, the present invention is used in a traveling working machine with an undercarriage and an uppercarriage rotatably arranged thereon. Advantageously, the traveling working machine of the present invention therefore includes an undercarriage, on which the traveling gear, the service brake system and the brake valve are arranged, and an uppercarriage rotatably arranged on the undercarriage, on which the control element is arranged. In particular, the control element is disposed in the operator cabin arranged on the uppercarriage. Due to the fact that the actuation of the brake valve now is effected electrically, the number of rotary joint passages between the uppercarriage and the undercarriage can be reduced, so that the complexity of the rotary joint is decreased.

In a furthermore advantageous way, at least one hydraulic accumulator is provided, which supplies the hydraulic service brake system with pressure, wherein the accumulator is arranged in the undercarriage. This in turn results in short hydraulic paths and a compact arrangement of the hydraulic service brake system.

Advantageously, the hydraulic accumulator is charged via a hydraulic pump arranged in the uppercarriage, wherein in particular an accumulator charging valve is provided, which is arranged in the uppercarriage. As a result, the hydraulic pump usually arranged in the uppercarriage, via which the hydraulic actuators of the working machine are supplied with hydraulic pressure, can also be used to supply the hydraulic accumulator of the hydraulic service brake system with pressure. Only one rotary joint passage is required for charging the hydraulic accumulator.

In a furthermore advantageous way, at least one emergency valve is provided, which in a case of emergency, in particular a rupture of the electric control line for actuating the brake valve, supplies the hydraulic service brake system with the full brake pressure. Advantageously, the emergency valve likewise can be actuated electrically for this purpose, and in the case of a rupture of the electric control line for actuating the brake valve automatically switches to emergency operation.

In a furthermore advantageous way, at least one reversing valve is provided, which in a case of emergency separates the brake valve from the service brake system and connects the emergency valve with the service brake system. In this way, it is ensured that in a case of emergency no pressure drop is obtained over a brake valve which e.g. is not completely closed.

In accordance with the invention, an extremely safe service brake system thus is obtained by the emergency valve, possibly in combination with the reversing valve.

Advantageously, the brake valve is configured as a pressure-reducing valve. Via such pressure-reducing valve, the service brake system can e.g. proportionally be supplied with brake pressure. By using a pressure-reducing valve, a particularly good response behavior of the service brake system is obtained, so that sensitive braking is possible. Advantageously, a pressure-reducing three-way valve is used.

In a furthermore advantageous way, an electronic control is provided, by means of which the response behavior of the brake valve can be adjusted upon actuation of the control element. By means of this electronic control, the brake characteristic of the traveling working machine can be adjusted.

In a furthermore advantageous way, the traveling working machine of the present invention includes at least two brake circuits, which separately are supplied with pressure via at least one brake valve each. By means of this redundant configuration, a double safety of the service brake system is obtained.

Advantageously, the two brake circuits are supplied with pressure via hydraulic accumulators, which are arranged in the undercarriage and which are charged via a common hydraulic line. Thus, there are provided two separate brake circuits with their respective hydraulic accumulators, wherein nevertheless only one rotary joint passage is necessary for charging the same. In turn, this provides a particularly simple construction.

BRIEF DESCRIPTION OF THE DRAWING

The present invention will now be explained in detail with reference to an embodiment and a drawing.

DESCRIPTION OF THE PREFERRED EMBODIMENT

The only FIGURE shows a first embodiment of a service brake system of a traveling working machine in accordance with the invention.

The traveling working machine advantageously is a construction machine, in particular a construction machine with a hydraulic drive for the traveling gear and/or the working machines, in particular a hydraulic excavator.

In the embodiment of a service brake system as shown in the only FIGURE, the hydraulic service brake system for the traveling gear includes brakes 10, by means of which the wheels of the traveling gear can be braked while driving. The service brake system with the brakes 10 is supplied with pressure via the brake valves 1, wherein the brake valves 1 can be actuated electrically in accordance with the invention. There is provided an electric control line, via which the brake valves 1 are connected with a control element, by means of which an operator can brake the traveling working machine.

Due to the electronic actuation of the brake valves 1, the same need not be arranged in the operator cabin, but can be placed in the vicinity of the brakes, so that an expensive tubing in the operator cabin can be omitted. There must merely be provided the control element, which converts the operator commands into an electric control signal for actuation of the brake valves 1. As control element, e.g. a brake pedal can be provided. Furthermore, an electronic control advantageously is provided, by means of which the response behavior of the brake system can be adjusted e.g. via a software.

The brake system of the invention is used in a traveling working machine with an undercarriage and an uppercarriage rotatably arranged thereon. The traveling gear, the service brake system with the brakes 10 and the brake valves 1 are arranged in the undercarriage, whereas the control element is arranged in the uppercarriage, e.g. in the operator cabin. Furthermore, hydraulic accumulators 4 are provided in the undercarriage, via which the hydraulic service brake system is supplied with pressure. The hydraulic accumulators 4 are charged via a hydraulic pump 7, which is arranged in the uppercarriage. For this purpose, an accumulator charging valve 6 is provided, which likewise is arranged in the uppercarriage. For charging the accumulators, there is merely required a rotary joint passage in the rotary joint 5 between the uppercarriage and the undercarriage. The hydraulic accumulators are connected with a charging line via check valves 8.

The brake system of the invention includes two brake circuits, which each are separately pressurized via a brake valve 1. The pressure for pressurizing the respective brake circuits can also be provided separately via respectively provided hydraulic accumulators 4. The same can, however, be charged via a common hydraulic line, wherein they are each separately connected with the same via check valves 8. The brake circuit shown on the left in FIG. 1 is responsible for the right-hand front wheel and the left-hand rear wheel, the circuit shown on the right for the left-hand front wheel and the right-hand rear wheel. This results in an increased safety of the brake system in accordance with the invention.

The brake valves 1 each are configured as pressure-reducing three-way valves, which are connected with the hydraulic accumulators 4 via hydraulic lines 11 and with the return via the hydraulic line 9. Due to the connection of pressure-reducing valves, the two brake circuits can proportionally be supplied with brake pressure, so that sensitive braking is possible.

Furthermore, emergency valves 2 each are provided, by means of which the brake circuits each can be supplied with the full brake pressure in a case of emergency or in a case of cable rupture. For this purpose, the emergency valves likewise are connected with the hydraulic accumulators 4 via hydraulic lines 11. The emergency valves likewise are actuated electrically and each automatically supply the brake circuits with the full brake pressure in particular in the case of a rupture of the electric control line for actuating the brake valves 1.

Furthermore, reversing valves 3 are provided, which ensure that in a case of emergency no pressure drop occurs e.g. over a pressure-reducing valve 1 which is not completely closed. The reversing valves are arranged between the outlets of the emergency valves 2 and the brake valves 1 and are connected with the respective brake circuits, so that in normal operation, when no brake pressure is present at the outlet of the emergency valve, the outlet of the brake valve is connected with the brake circuit. On the other hand, if brake pressure is present at the outlet of an emergency valve 2, the reversing valves automatically connect the same with the brake circuit and automatically separate the outlet of the brake valve from the brake circuit.

In accordance with the invention, an extremely safe brake system thus is obtained, in which an expensive tubing into the operator cabin and the disadvantages involved hence can be omitted. In addition, an adjustable response behavior of the service brake system is obtained by the electronic actuation. Furthermore, the complexity of the rotary joint is reduced, since less rotary joint passages are required.

The invention claimed is:
1. A hydraulic excavator, comprising
   a traveling gear,
   a hydraulic service brake system for braking the traveling gear,
   two braking valves arranged to supply pressure to the hydraulic service brake system which comprises two braking circuits, each arranged to be supplied with pressure from a respective braking valve,
   a control element connected to the two braking valves via an electric control line to electrically actuate the two braking valves, by which an operator can brake the traveling working machine,
   two emergency brake valves,
   two reversing valves, each arranged to separate a respective braking valve from the service brake system in an emergency and connect a respective emergency brake valve with the service brake system,
   two hydraulic lines, each connected to a respective braking valve,
   two accumulators arranged to supply the hydraulic service brake system with pressure and charge the hydraulic lines,
   a check valve positioned between the accumulators and the hydraulic lines,
   an undercarriage on which the traveling gear, the service brake system, the braking valves, the braking circuits, the emergency brake valves, the reversing valves, the hydraulic lines, the accumulators and the check valve are ail mounted, an uppercarriage rotatably mounted on the undercarriage, and on which the control element is arranged, a rotary joint through which the uppercarriage is rotatably mounted on the undercarriage, an accumulator charging valve mounted on the uppercarriage, a hydraulic pump mounted on the uppercarriage and arranged to charge the hydraulic accumulators through the accumulator charging valve, and a single passage through rotary joint for charging the hydraulic accumulators and operating the hydraulic brake system.

2. The hydraulic excavator according to claim 1, wherein the braking valves are configured as pressure-reducing valves.

3. The hydraulic excavator according to claim 1, additionally comprising an electronic control arranged to adjust response behavior of the braking valves upon actuation of the control element.

4. The hydraulic excavator according to claim 3, wherein the two braking circuits are arranged to be supplied with pressure via the hydraulic accumulators comprising a common hydraulic line arranged to charge the two braking circuits from the hydraulic accumulators and also mounted on the undercarriage.

5. The hydraulic excavator according to claim 1, comprising a charging line guided through the rotary joint between uppercarriage and undercarriage, and coupling the accumulator charging valve and the check valve.

6. The hydraulic excavator according to claim 5, wherein the emergency brake valves are arranged, in a case of a rupture of the electric control line, for actuating the braking valves, to supply the hydraulic service brake system with full brake pressure.

7. The hydraulic excavator according to claim 6, wherein the reversing valves are arranged, in a case of the rupture of the electric control line, for separating the brake valves from the service brake system and connecting the emergency brake valves with the service brake system.

8. The hydraulic excavator according to claim 5, wherein the accumulator charging valve and the check valve are directly coupled to one another through the rotary joint.

9. The hydraulic excavator according to claim 1, wherein the accumulator charging valve and the check valve are directly coupled to one another through the rotary joint.

\* \* \* \* \*